United States Patent Office 2,748,659
Patented June 5, 1956

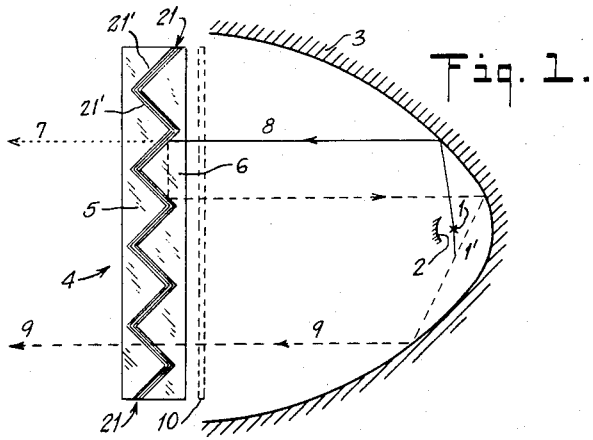
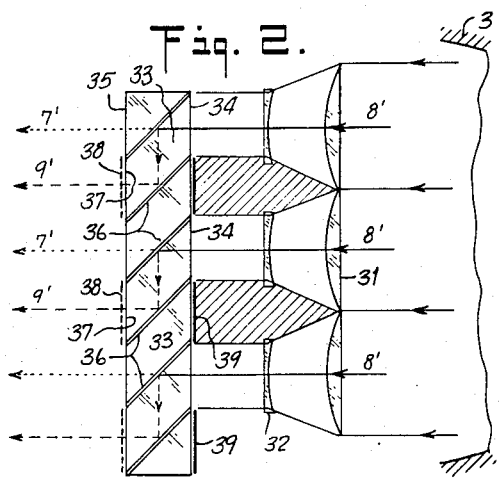

2,748,659

LIGHT SOURCE, SEARCHLIGHT OR THE LIKE FOR POLARIZED LIGHT

Walter Geffcken and Hubert Schröder, Landshut, Germany, assignors to Jenaer Glaswerk Schott & Gen., Landshut, Germany, a firm Application February 26, 1951, Serial No. 212,725

16 Claims. (Cl. 88—65)

This invention relates to light polarizers.

It has been found that the light polarizers heretofore known utilize only a fraction (theoretical maximum 50%) of the original light intensity. For example, a vehicle headlamp constructed to provide linear polarized light with the polarization films at present available, will radiate only about ⅓ of the original intensity so that after passage through analyzer goggles placed in parallel position, only about 20 to 25% of the unpolarized radiation reaches the eye. The remainder of the light energy is absorbed in the films and is lost as heat. It is possible to avoid such losses by utilizing the principles of the old glass plate set, but this is impractical because such a polarizer would require a very large number of glass plates through which the reflected components would be split up into double the number of partial beams of diminishing intensity. It has been suggested to utilize all of these partial beams and to direct them into the same radiation and vibration direction, but this suggestion has never been practically utilized because of the low efficiency and unwieldiness of the glass plate set. It has also been suggested to embed a plurality of alternating high and low refracting layers between prismatic transparent bodies to provide an interference polarizer capable of transforming practically all the incident light into two partial beams differently polarized and proceeding in different directions. Such an interference polarizer which is in the nature of a micro glass plate set, is free from the drawbacks of the old glass plate set and far excels the latter in efficiency. To provide such an interference polarizer capable of making both beams travel in the same direction, it has been suggested to effect a rotation of the vibration direction for the reflected beam by means of a doubly refracting plate and then to deflect such beam by means of a second polarizer into the same direction of propagation as that of the first beam or component passing through the first polarizer. This solution to the problem of polarizing a radiation in one direction practically free from loss, however, is applicable only for light beams of moderate cross section, unless there are used very large, heavy and expensive prisms.

The general object of the present invention is to provide a light polarizer which will avoid the undesirable light loss of prior polarizers, which will deflect back the reflected partial beam into the primary direction of the beam, and which will be practical to manufacture in a relatively inexpensive manner.

Another object of the invention is to provide a light polarizer which is particularly advantageous for use with lights of large area, such as the headlamps of a vehicle.

A further object of the invention is to provide a light polarizer which has a small space requirement, has relatively smooth exterior surfaces and which is relatively simple to manufacture.

Other objects of the invention as well as the advantages and novel features of construction thereof, will become apparent from the following description when read in connection with the accompanying drawings, in which Fig. 1 is a diagrammatic view illustrating one form of the invention as applied to a vehicle headlamp;

Fig. 2 is a diagrammatic view showing another form of light polarizer constructed in accordance with the invention and showing a form of light constricting device which may be used with such polarizer;

Fig. 3 is a view similar to Fig. 2 and showing a further embodiment of the invention and another form of light constricting device;

Fig. 4 is a diagrammatic view showing another form of parallel faced polarizer body embodying the features of the invention; and Fig. 5 is a view similar to Fig. 4 and showing still another form of parallel faced polarizer body embodying the features of the invention.

Referring now to Fig. 1 of the drawings, the numeral 1 designates the light source of a headlamp with a paraboloid mirror 3 and provided with a small spherical mirror 2 to deflect the radiation of the light source or lamp 1 to the headlamp mirror 3. The headlamp mirror 3 is preferably so shaped that approximately parallel light beams are passed to the interference polarizer body 4, which includes alternating high and low refracting polarizing layers 21 in the form of steps or V-shaped corrugations 21'. By thus forming the layers 21 in this corrugated fashion, the interference polarizer is split into a system of individual polarizers lying side by side. The layers 21 are so arranged that for the beams or rays falling upon them at the angle of incidence $\alpha$, the relation holds:

$$\sin^2 \alpha \geq \frac{n_h^2 \cdot n_l^2}{n_g^2(n_h^2 + n_l^2)}$$

wherein $n_h$=the refractive index of the high refracting layers of the polarizing layers 21, $n_l$=the refractive index of the low refracting layers of the polarizing layers 21, and $n_g$=the refractive index of the glass bodies 5, 6 of the polarizer body 4.

The individual corrugation faces 21' of the polarizing layers 21 forming the system of individual polarizers are alternately inclined approximately ±45° to the incident ray direction. Thus two adjacent or neighboring corrugation faces 21' together form an angle of approximately 90°, so that a ray falling upon a corrugation face will be thrown back by such face and the neighboring face into its original direction. The corrugated polarizing layers 21 may be applied to a suitably formed transparent support 6 and the furrows filled with a transparent material or such layers cemented to a second body 5 ground or pressed into a suitable shape. If desired, this second body 5 may also carry polarizing layers. It is preferable that the complete polarizer be constructed to provide a plane parallel plate 4, as shown in Fig. 1 of the drawings. While the corrugation faces are shown constructed for passing parallel light through the polarizer plates, it will be understood that such faces can be formed for divergent light by providing them with a curvature such that the incident rays all cut them at equal angles $\alpha$ for which the relation above mentioned holds. In such a construction, the outer surfaces of the plate formed by the bodies 5 and 6 should have a similar curvature so that they stand perpendicular to the arriving and departing rays. The bodies 5 and 6 may be made of any suitable prism glass material, such as strainless or organic glass.

Half of the light of the beams or rays 8 coming from the lamp mirror 3, namely, the component 7 thereof vibrating in the plane of the drawings, passes rectilinearly through the corrugation faces. The component 7 of the beam or ray is shown in dotted line in Fig. 1 of the drawings. The other perpendicularly vibrating component 9 of each beam shown in broken line in Fig. 1, is reflected and strikes an adjacent or neighboring corrugation face and is deflected back into the lamp space, as has been previously mentioned, to form a real image of the light source at 1'. As is known, the illumination field of a headlamp is an image of the light source, magnified in proportion to the focal length of the mirror. In the present case, this source consists not only of the actual light source 1, but also of its image 1' produced by the deflection back into the lamp space. One can make the two light source images of equal or different size in the illumination field with the aid of appropriate optical accessory means. Preferably the light source should be so adjusted that its image immediately adjoins it, since it is desirable in a headlamp to concentrate the luminosity upon the smallest illumination field possible. In order not to have the image of the light source produced by the polarizer in the lamp space coincide with the light source itself with consequent increased temperature of the radiant, the rays should be incident at a slight inclination to the normal plane of the corrugation faces. The components 9 of the beams or rays departing from the images of the light source again pass through the polarizer body 4 in the same direction as the original rays 8 and the components 7 thereof.

Located between the polarizer 4 and the light source is a phase retarding plate 10 which is always passed twice by the reflected component 9 of the beams or rays so that vibration plane after the second passage, when the plate is appropriately oriented $\lambda/4$ plate, is rotated by 90° from its original vibration plane. If the reflection of the reflected component 9 occurs under greater angles of incidence and repeatedly, then it is advisable to employ in place of the $\lambda/4$ phase plate, a lamina of another phase difference which will eliminate the supplementarily affected polarization.

The reflected component of the light beams or rays may also be utilized in accordance with the invention by constructing the transparent body in which the system of partial polarizers is embedded, so that the entrance of the primary unpolarized radiation into such body is restricted to band shaped surfaces separated from one another in a direction substantially perpendicular to the direction of the arriving rays by spaced reflecting surfaces. As shown in Fig. 2 of the drawings, such a construction may include a plurality of (parallelepiped) shaped prism bodies 33 of stainless or organic glass arranged to form a parallel faced body. Between the inclined opposed faces of the prism bodies 33 lie the polarizing layers 36. The polarizing layers between each adjacent pair of prism bodies are equidistant and parallel to the polarizing layers between one of such prism bodies and a prism body adjacent to the latter. The relationship of the lengths of such polarizing layers and the distances between adjacent layers is such that the projections of such layers on a plane perpendicular to the passing rays join one another without gaps. This relationship may be such that such projections of the layers may mutually overlap to obtain an increased degree of polarization. The end surfaces of alternate such prism bodies on the incident surface of the parallel faced body are blocked by reflecting surfaces 39 which are made reflecting both on the inside and on the outside. The end surfaces of the other alternate such prism bodies on the beam emerging side of the parallel faced body are provided with rotating producing $\lambda/2$ phase platelets 38.

It will be seen from Fig. 2 of the drawings, that the light beams 8' entering the surfaces 34 of the parallel faced body between the reflecting surfaces 39 pass to the polarizing layers 36, extending in inclined relation between adjacent surfaces 39, and are split by the polarizing layers 36 into two components; one component 7' passing through the polarizing layers 36, and leaving through the surfaces 35 on the emerging side of the parallel faced body between the phase platelets 38, and the other component 9' vibrating perpendicular thereto and being reflected by layers 36 upon the adjacent layers 36. The reflected component 9' of the light is again deflected by the layers 36 into the original direction of the light so that such component passes through the surfaces 37 located between surfaces 35 on the emerging side of the parallel faced body, where it is rotated 90° in the vibration plane by the platelets 38. The surfaces behind layers 36 are preferably blackened to intercept possible interfering light.

Because of the equidistance of the polarizing layers 36 and the rectilinear construction of the prisms 33, if the light to be polarized is not constituted of parallel beams, one obtains with the polarized light produced by a polarizing system such as shown in Fig. 2, either unpolarized light or falsely polarized light. It is possible however, to construct the polarizing prism system of Fig. 2 for use with light having diverging light beams by forming the cemented prism system so that the entering surfaces 34, the surfaces 39 and the surfaces 35 and 37 are disposed perpendicularly to the transmitted rays while still maintaining the polarizing layers 36 in position to be struck by the arriving rays at an angle of $\alpha$, for which the relation of the above given equation shall hold. In such a construction, the prisms will be arranged as a whole in an arc-shaped fashion instead of in the straight vertical fashion shown in Fig. 2 of the drawings. Instead of forming the prisms in such arc-shaped fashion, the same result can also be accomplished by varying the distance between the polarizing layers 36 in such manner that the diverging transmitted beams from the lamp will just fully illuminate the entire area of the polarizing layers in the system. In this arrangement, it is preferable that the vibration in the distance displacements between the polarizing layers be kept relatively small so that the changes of the angle of incidence for the layers be kept within the validity limits of the previously given equation.

In order to fully utilize the lamp radiation, the surfaces 39 may be metalized so that the light faling upon them is reflected back into the lamp space, or band-like metalized glass plates may be placed obliquely in the light before the polarizer system to deflect the light which would impinge on the surfaces 39, or by providing in the ray space of the parallel beams from the head light a telescopic cylindrical imaging system capable of effecting constricted bands of such ray cross section on the entrance surfaces 34. As shown in Fig. 2, such an imaging system may comprise a system of positive band-shaped cylindrical lenses 31 arranged in a row in contact with one another and each having a width twice as great as the width of an entrance surface 34. The arrangement of the lenses 31 is such that the median plane of each cylinder lens band coincides with the median plane of an entrance surface 34. At a distance of one-half the focal length of this system and between the same and the surfaces 34, is located a negative lens system 32 of half focal length, and arranged to cause the converging rays from the system 31 to enter the surfaces 34 in parallel relation. For the aperture of the lens screen, a ratio of about 1:10 is recommended. It will be seen that with such an arrangement one can polarize the total radiation supplied by the headlamp without change of the normal light beam cross section and practically without loss. Instead of the aforesaid two cylinder lens systems, the same results can be accomplished by a single constricting system, such as the system indicated generaly by the reference numeral 40 in Fig. 3 of the drawings and constituted of an arrangement of lenses made of pressed glass or synthetic material.

In the application of unfiltered incandescent light and visual observation, the thickness of the phase platelets 38 should be such that the desired phase retardation will occur at the maximum of the spectral visual sensitivity curve, namely, $\lambda_0 = 555\ m\mu$. In the arrangement shown in Fig. 2, in which the phase platelet is traversed after the exit from the polarizing system, it is not possible to achieve a completely linear polarization for the rotated component in the spectral regions farthest removed from $\lambda_0$. As a result in the use of such an arrangement, one will observe with a crossed analyzer, a faint violet to purple colored residual light. In those cases where especially high requirements as to purity of polarization are demanded, this residual light can be excluded in accordance with the invention, by adding a further polarizing system in the manner shown in Fig. 3 of the drawings. In the arrangement shown in Fig. 3, the primary polarizer like the polarizer of Fig. 2, is composed of parallelepiped shaped prisms 41 arranged to form a parallel faced body. Between the inclined opposed faces of the prisms 41 are equidistant, parallel polarizing layers 42, 43 arranged in the same manner as the polarizing layers 36 of the arrangement of Fig. 2. The incident faces of alternate prisms 41 are blocked by surfaces 44 and the emerging faces of such alternate prisms are provided with rotating producing $\lambda/2$ phase platelets 45. The surfaces 44 may be metallized or blackened, depending upon the illuminating means utilized. The supplementary polarization system is composed of prisms 46 constructed and arranged so that the polarizing layers 47, 48 form continuations of the polarizing layers 42 of the primary system. Thus, the polarizing layers of the suplementary system are spaced apart twice the distance between the polarizing layers of the primary system. The back sides 49 of the layers 48 of the supplementary system are preferably blackened.

The radiation 51 arriving through the entrance surfaces 50 of the primary system is divided by the layers 43 into the parallel and vertical components designated 52 and 53, respectively. The parallel component 52 of each beam 51 is rotated by a $\lambda/2$ phase platelet 45, and falls upon a polarizer 48 of the supplementary system which deflects it toward opposed plate 47 of the adjacent polarizing layers. After reflection at the opposite lying polarizer 47, the component 52 leaves the supplementary system. The vertical component 53 of each beam is reflected by the polarizer layers 43 and 42, respectively, in the manner shown in Fig. 3, and then proceeds parallel and unidirected with the component 52.

One of the surfaces 47, 48 of the supplementary polarizer may be replaced by a customary metallic reflecting layer. Thus, as shown in Fig. 4 of the drawings, if the polarizer layers 48 of Fig. 3 are replaced by reflecting layers 54, the phase platelets 45' may be arranged in parallel relation in front of such layers 54, instead of at the emerging ends of the alternate prisms in the primary system, as shown in Fig. 3. In an arrangement such as shown in Fig. 4 however, one must choose the platelets 45' so that the phase retardation affected by them together with the phase retardation affected by the mirrors 54 in the passage of the component 52 through the supplementary system, amounts to exactly $\lambda/2$.

The two polarizer systems shown in Fig. 4, may also be combined into a joint system in the manner shown in Fig. 5 of the drawings. In effecting such combinations, the equidistant polarizing layers 42', 43' extend continuously through the parallel faced body formed by the prisms 55, and are of such length that in their projection perpendicular to the ray direction, they mutually overlap by a half. In the same projection, the metallized layers 54', the blackened layers 49', and the phase platelets 45'', which also continuously extend through the parallel formed body, precisely join one another. The polarizing layers 43' lying behind the light entrance surface 50', are therefore between the polarizing layers 42', blackened by the layers 49' and the phase platelets 45'' which backwards border on the metallized layers 54'. Directly on the backside of each metallized layer 54' lies the blackened layer 49' of the next element.

The arrangements shown in Figs. 4 and 5, and especially that shown in Fig. 5, are particularly suitable for manufacture. In constructing the arrangements of Figs. 2 to 5, it is preferable that one hard cements together as many plane plates as the completed system shall contain individual elements after coating them with the polarizing layers. The cemented plates are then cut in the required oblique direction into parallel faced body plates of the desired thickness, after which the cut surfaces of such body plates are polished. To eliminate strains, the polished bodies are then subjected to heat treatment and slowly cooled in accordance with known practice. The advantages of constructing the polarizers in the forms of Figs. 4 and 5 over that of Fig. 3, is that one can in simple operations coat the plates with the phase film, metallize, blacken and then cement them together, thereby eliminating the difficult adjustment labor required in placing the phase plates in the manner shown in Fig. 3.

Suitable materials for building up the alternate high and low refracting polarizing layers in the polarizer described, are silicic acid, alkaline-earth fluorides and cryolite for the low refracting layer material, and sulphides of zinc or cadmium, heavy metal chlorides, such as lead chloride and thallium chloride, and metallic oxides, such as those of titanium, antimony and tin, for the high refracting layer material. These layer materials may be built up in any suitable manner, such as in vacuum by vaporization or sputtering, or by precipitation from the colloidal, liquid or gaseous phase.

The linear polarized partial beams which one obtains with the use of exclusively isotropic layer materials, can be transferred into circular or elliptical polarized radiation by providing suitably oriented $\lambda/4$ platelets. This is of particular importance for fog headlamps, in which as is known, the back scattering can be greatly reduced by use of circular polarized light.

The aforesaid dependence of the phase retardation on the wave length can lead to a departure from the linearity of the polarization at the ends of the spectrum. The linearity of the polarization can also be realized however, through the color effects associated therewith. By selecting for linear polarized light, phase retarders of a higher order such as $3\lambda/2$, $5\lambda/2$, etc., the spectral region of adequate linearity will become even narrower so that there will be provided several phases of linearity in the visible, between which phases lie regions of elliptic or circular polarization. Thus, if one uses, by way of example, a phase retarder of $7\lambda/2$ for $\lambda=550$ m$\mu$, then one has a phase retardation at $5\lambda/2$ at 770 m$\mu$, and of $9\lambda/2$ at 430 m$\mu$. At these three places therefore, the light will be completely extinguished by a crossed analyzer. On the other hand, at $\lambda=640$ or 480 m$\mu$ (phase retardation=3 or $4\lambda$), there would result an extinction of one of the components, since the other component would not be rotated. At all other places of the spectrum, one would have elliptic or circular polarized light. The color effects brought about thereby would be useful for other purposes, such as for signaling.

The phase retarder plates or platelets may be made of any suitable materials, such as crystal-clear organic materials, like cellulose ester, polyvinylalchol or the like. Films of such materials when assembled in manufacture, should preferably be subjected to a directed tension.

We claim:

1. A light polarizer comprising a light transmitting body having parallel incident and emergent surfaces, a system of beam splitting interference polarizers between opposed interfaces in said body and traversing as a whole the area of said body, said system being composed of a plurality of individual polarizers, each inclined at a predetermined angle to said parallel incident and emergent surfaces and so positioned with relation to adjacent, individual polarizers that projections of such individual polarizers perpendicularly on a common plane parallel to said incident and emergent surfaces will join one another without gaps, means partially blocking the light entrance area to said system so that the entrance area for the unpolarized radiation is restricted to band-shaped surfaces separated from one another, phase retarder means provided on said body within the area defined by said system for rotating the vibration plane of one of the two split vibration components of the light beams into that of the other and being so constructed and arranged with relation to said individual polarizers that a perpendicular projection of said phase retarder means on said common plane superimposes on projections of individual polarizers on said system, and reflecting means provided on said body within the area defined by said system for reflecting the deflected separated components into the original direction of the impinging light beams and being so constructed and arranged with relation to said individual polarizers that a perpendicular projection of the said reflecting means on said common plane superimposes on projections of individual polarizers in said system.

2. A light polarizer such as defined in claim 1, including means between said blocking means and the radiation source, and constructed and arranged to effect a periodic construction of the beam cross section on the spaced band-shaped entrance surfaces to said system.

3. A light polarizer comprising a plate-like body having plane parallel incident and emergent surfaces and formed of a plurality of cemented, parallelepiped light transmitting bodies inclined at a predetermined angle to said plane parallel surfaces and whose limiting surfaces stand perpendicular to the transmitted light beams, said incident and emergent surfaces being formed from such limiting surfaces, a system of beam splitting interference polarizers traversing as a whole the area of said plate-like body, said system being composed of a plurality of individual polarizers, each embedded between adjacent parallelepiped bodies so as to be inclined at said predetermined angle to said plane parallel incident and emergent surfaces, and so positioned with relation to adjacent individual polarizers that projections of such individual polarizers perpendicularly on a common plane parallel to said incident and emergent surfaces will join one another without gaps, band-shaped blocking layers on the incident limiting surfaces of alternate such parallelepiped bodies forming the incident surface of said plate-like body so that the entrance area for the unpolarized light to said system is restricted to the incident limiting surfaces of the other such parallelepiped bodies forming the incident surface of said plate-like body, phase retarder means provided on said plate-like body within the area defined by said system for rotating the vibration plane of one of the two split vibration components of the light beams into that of the other and being constructed and arranged with relation to said individual polarizers that a perpendicular projection of said phase retarder means on said common plane superimposes on projections of individual polarizers in said system, and reflecting means provided on said plate-like body within the area defined by said system for reflecting the deflected separated components into the original direction of the impinging light beams, and being constructed and arranged with relation to said individual polarizers that a perpendicular projection of said reflecting means on said common plane superimposes on projections of individual polarizers in said system.

4. A light polarizer such as defined in claim 3 in which individual polarizers in said system are prolonged in their inclined direction so that their said projections on said common plane overlap perpendicular projections of individual polarizers in said system on said common plane.

5. A light polarizer such as defined in claim 3 in which the phase retarder means is composed of a plurality of phase platelets provided on the emergent limiting surfaces of alternate such parallelepiped bodies and are contained in a plane parallel to the incident and emergent surfaces of said plate-like body.

6. A light polarizer comprising a light transmitting body having parallelly arranged incident and emergent surfaces, a system of beam splitting interference polarizers between opposed interfaces in said body and traversing as a whole the area of said body transverse to the direction of the impinging light beams, said system being composed of a plurality of individual polarizers, each inclined at a predetermined angle to the incident and emergent surfaces of said light transmitting body and so positioned with relation to adjacent individual polarizers that projections of such individual polarizers perpendicularly on a common plane parallel to said incident and emergent surfaces will join one another without gaps, means partially blocking the light entrance area to said system so that the entrance area for the unpolarized radiation is restricted to band-shaped surfaces separated from one another, phase retarder means within the area defined by said system for rotating the vibration plane of one of the two split vibration components of the light beams into that of the other, reflecting means within the area defined by said system for reflecting the deflected separated components into the original direction of the impinging light beams, and a second polarizing system positioned behind said first mentioned polarizing system considered in the direction of the impinging light beams so that the light rays emerging from said first polarizing system pass through said second polarizing system to eliminate incomplete polarization produced by the phase retarder, said second polarizing system being composed of a plurality of individual polarizers each inclined to the passing light beams impinging thereon at an angle the same as the angle of inclination of the individual polarizers in said first polarizing system.

7. A light polarizer such as defined in claim 6 in which said phase retarder means is positioned between said first polarizing system and said second polarizing system.

8. A light polarizer such as defined in claim 6 in which the individual polarizers of said second system are embedded between light transmitting bodies whose opposed interfaces form continuations of the interfaces between which are positioned alternate individual polarizers of said first polarizing system so that the partial polarizers of said second polarizing system are spaced apart a distance twice that of the individual polarizers of said first polarizing system.

9. A light polarizer comprising a light transmitting body having parallelly arranged incident and emergent surfaces, a system of polarizers between opposed interfaces in said body and traversing as a whole the area of said body transverse to the direction of the impinging light beams, said system being composed of a plurality of individual polarizers, each inclined at a predetermined angle to the incident and emergent surfaces of said light transmitting body and so positioned with adjacent individual polarizers that projections of such partial polarizers perpendicularly on a common plane parallel to said incident and emergent surfaces will join one another without gaps, a plurality of said individual polarizers forming a primary polarizing means and a plurality of said individual polarizers forming a secondary polarizer to eliminate incomplete polarization produced by the phase retarder means, means partially blocking the light entrance area to said system so that the entrance area for the unpolarized radiation is restricted to band-shaped surfaces separated from one another, phase retarder means provided on said body within the area defined by said system for rotating the vibration plane of one of the two split vibration components of the light beams into that of the other, and being constructed and arranged with relation to said individual polarizers that a perpendicular projection of said phase retarder means on said common plane superimposes on projections of individual polarizers in said system, and reflecting means provided on said body within the area defined by said system for reflecting the deflected separated components into the original direction of the impinging light beams, and being constructed and arranged with relation to said individual polarizers that a perpendicular projection of said reflecting means on said common plane superimposes on projections of individual polarizers in said system.

10. A light polarizer such as defined in claim 9, in which the individual polarizers of the secondary polarizer means are spaced apart a distance twice that of the individual polarizers of the primary polarizing means, and in which each of the individual polarizers of the secondary polarizing means has an outer layer facing the direction of the impinging light beams, and a layer unpervious to rays in back of such outer layer.

11. A light polarizer such as defined in claim 9, in which the individual polarizers of the secondary polarizer means form continuations of alternate individual polarizers of the primary polarizing means and are positioned in back of the primary polarizing means considered in the direction of the impinging light beams.

12. A light polarizer such as defined in claim 9 in which said phase retarder means is composed of a plurality of spaced, phase platelets, each positioned parallel to said common plane and in front of the secondary polarizer means and between an individual polarizer of the secondary polarizer means and an adjacent individual polarizer of the primary polarizing means spaced from said individual secondary polarizer.

13. A polarizer such as defined in claim 9 in which said light transmitting body is constituted of a plurality of glass bodies extending continuously through such body from the incident surface thereof to the emergent surface thereof, and in which the individual polarizers of the primary and secondary polarizing means are parallelly arranged between the opposed interfaces of said glass bodies.

14. A polarizer such as defined in claim 13 in which alternately spaced pairs of opposing interfaces of said glass bodies have positioned between each such pairs an outer light transmitting polarizing layer, a reflecting layer positioned in front of said polarizing layer considered in the direction of the impinging light beams, an opaque layer between said polarizing layer and said reflecting layer and a phase retarding plate constituting part of said phase retarding means in front of said reflecting layer, said layers extending continuously through such pair of opposed interfaces.

15. A light polarizer such as defined in claim 1, in which said light transmitting body is formed of a plurality of light transmitting plates inclined at a predetermined angle to said parallel incident and emergent surfaces, in which said individual polarizers are cemented between said plates, and in which said reflecting means comprise individual reflecting plates cemented between said light transmitting plates so that they are oriented parallelly to said individual polarizer.

16. A light polarizer comprising a plate-like body having plane parallel vertically disposed incident and emergent surfaces and formed of a plurality of cemented light transmitting bodies, a system of beam splitting interference polarizers embedded in said plate-like body between the parallel incident and emergent surfaces thereof and traversing as a whole the area of said plate-like body, said system being composed of a plurality of individual polarizers disposed one above the other in a stepped-like V-shaped arrangement which extends as a whole in a vertical direction and each positioned between opposed interfaces of said light transmitting bodies and undivided by other polarizers in said plate-like body, each of said individual polarizers being strip-like in form and extending horizontally between said plane parallel incident and emergent surfaces, a plurality of such polarizers in said system being disposed substantially at an angle of 90° to the other of such polarizers in said system and the faces of such polarizers being alternately inclined at approximately ±45° to the incident surface of said plate-like body, said polarizers being disposed across the area of said plate-like body in a vertical direction parallel to said incident and emergent surfaces that said individual polarizers as a whole traverse such entire area and join one another without gaps when viewed at right angles to said incident and emergent surfaces, said individual polarized strip splitting the incident beam into a polarized transmitted component and a reflected polarized component vibrated at right angles to that of the transmitted component, phase retarder means within the area defined by said system for rotating the vibration plane of the reflected beam component of the light into the same plane as the transmitted component, said phase retarder means traversing the area of said plate-like body in a vertical direction and completely overlying areas defined by individual polarizers in said system in a direction at right angles to said incident and emergent surfaces, and reflecting means within the area defined by said system of individual polarizers and positioned on the side of the retarder means opposite from that of the polarizer for reflecting the deflected separated component into the original direction of the impinging light beams, said reflecting means traversing the area of said incident and emergent surfaces and completely overlying areas defined by individual polarizers in said system in a direction at right angles to said incident and emergent surfaces.

References Cited in the file of this patent

UNITED STATES PATENTS

| | | |
|---|---|---|
| 1,733,915 | Short | Oct. 29, 1929 |
| 1,963,127 | Gardner | June 19, 1934 |
| 2,270,535 | Land et al. | Jan. 20, 1942 |
| 2,370,084 | Smith | Feb. 20, 1945 |
| 2,403,731 | MacNeille | July 9, 1946 |
| 2,449,287 | Flood | Sept. 17, 1948 |
| 2,453,194 | Buzzel | Nov. 9, 1948 |
| 2,476,014 | Wright | July 12, 1948 |

FOREIGN PATENTS

| | | |
|---|---|---|
| 460,666 | Great Britain | Jan. 28, 1937 |